July 21, 1931.    R. V. HUTCHINSON    1,815,621
SUPERCHARGER DRIVE
Filed Aug. 19, 1927
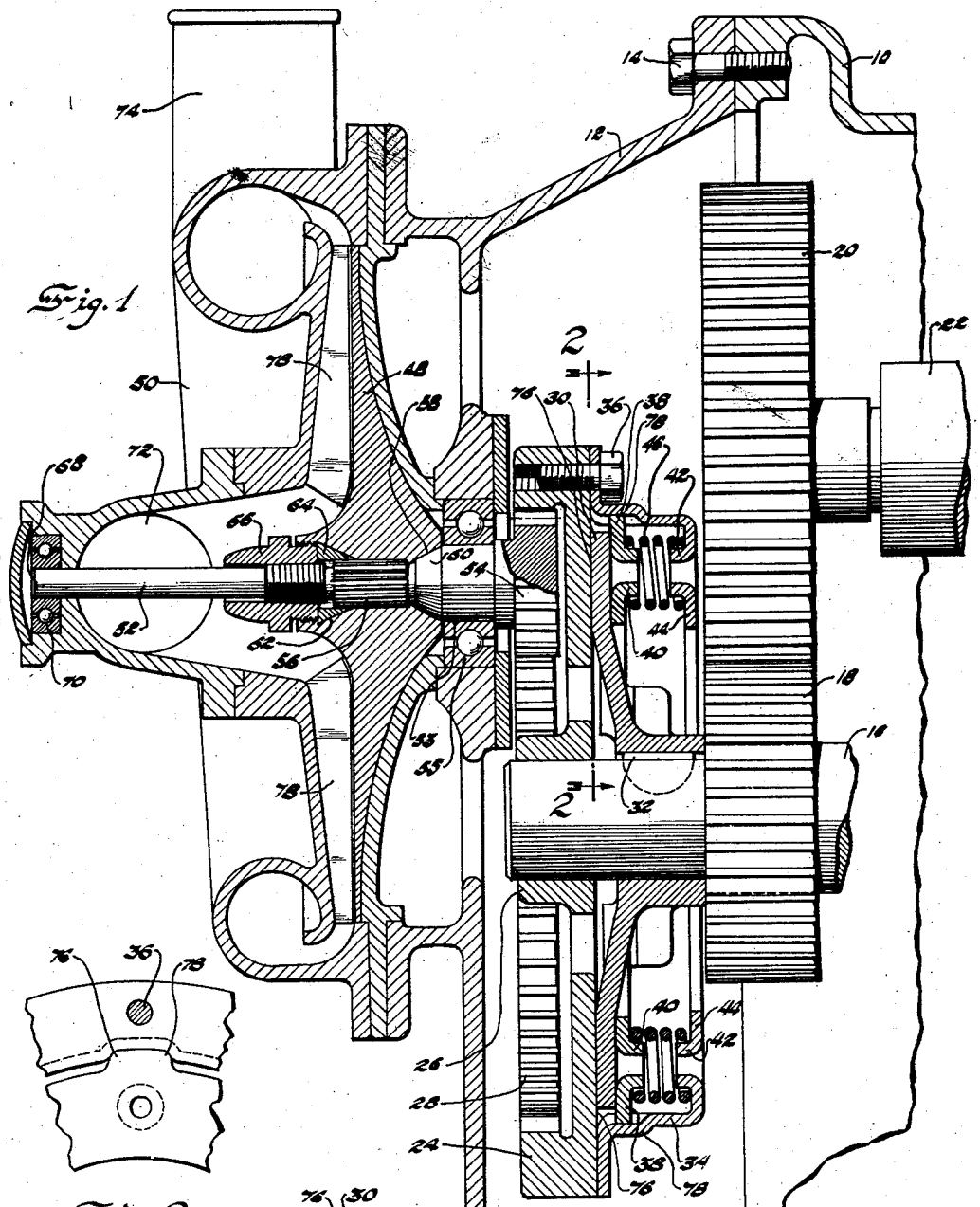
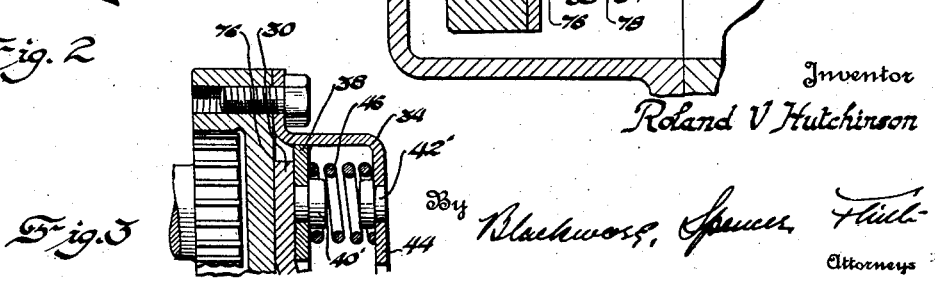
Inventor
Roland V Hutchinson
By Blackwood, Spencer, Hulit
Attorneys Patented July 21, 1931

1,815,621

UNITED STATES PATENT OFFICE

ROLAND V. HUTCHINSON, OF LANSING, MICHIGAN, ASSIGNOR TO GENERAL MOTORS RESEARCH CORPORATION, OF DETROIT, MICHIGAN, A CORPORATION OF DELAWARE

SUPERCHARGER DRIVE

Application filed August 19, 1927. Serial No. 214,095.

This invention relates to superchargers and has particular reference to a drive for a supercharger applied to internal combustion engines used on automotive vehicles.

Prior supercharger drive constructions have taken the power from the crankshaft or from the camshaft and the mechanism has been such that a positive and direct drive has been obtained at all times. The object of the present invention is to construct a drive which will be positive under ordinary conditions but which will permit a slipping between the crankshaft and the driven member during rapid changes of engine speed. The positive drives of prior constructions have caused injury to the supercharger drive mechanism during such conditions or excessive speeds of the engine; however with the present invention I am enabled to eliminate the danger of the breaking of parts due to the slippage allowed between the crankshaft and driven member when the danger condition is reached.

The object of the invention is accomplished by loosely and freely mounting a driving member on the front end of the crankshaft and operatively connecting thereto a driven member which drives the rotor of the supercharger. The driving member is preferably in the form of an internal gear while the driven member is in the form of a shaft and has an integral gear formed on one end thereof meshing with the driving member.

To connect the crankshaft with the driving member I provide a spider or disc keyed to the crankshaft and frictionally held against the driving member by means of a plurality of resilient members, preferably coil springs, held between a cover plate or housing secured to the driving member and a ring overlying the outer portion of the disc or spider. The resilient members may be held in place by any suitable means but are preferably seated over studs which project toward each other from the inner face of the cover plate and the ring.

The supercharger per se forms no part of my invention and is shown as of the conventional centrifugal type.

The invention is disclosed in the accompanying drawings in which:

Figure 1 is a sectional view through the front portion of the crankcase of an internal combustion engine.

Figure 2 is a sectional detail on the line 2—2 of Figure 1.

Figure 3 is a sectional detail of a modified form of connection between the cover plate and disc.

Referring to the numbered parts on the drawings, 10 indicates the crankcase having a separable section 12 secured thereto by means of bolts 14. The crankshaft is shown at 16, having secured thereto a gear 18 which meshes with a gear 20 secured to the camshaft 22.

On the outer end of the crankshaft 16 there is freely and loosely mounted a driving member 24 provided with a hub 26 and which is preferably in the form of an internal gear having teeth as shown at 28. The gear 24 is driven from the crankshaft 16 by means of the disc or spider 30, which frictionally engages the flat surface 76 of the gear 24 and which is keyed to the crankshaft as shown at 32 and enclosed within a housing or cover plate 34, secured to the gear 24 by means of the bolts 36. Within the cover plate 34 and frictionally engaging the right hand face of the disc 30, is a ring 38 having a plurality of projections or bosses 40 extending rearwardly from the disc. The cover plate 34 has at its inner face 44 a plurality of projections in the form of bosses 42 arranged axially with reference to the bosses 40 of the ring 38, and surrounding each pair of bosses 40 and 42 and extending between the ring 38 and the rear face 44 of the cover plate 34 is a resilient member 46, preferably in the form of a coil spring. In place of the bosses and the coil spring an ordinary flat spring may be secured to either the ring or the rear face 44 of the cover plate 34, and bear against the other.

The ring 38 is dogged to the cover plate 44 by means of the integral teeth 76 of the disc and the grooves or notches 78 in the annular portion of the cover plate. The purpose of this construction is to prevent the slippage between the parts from jamming the mechanism and also to hold the disc rotationally stationary with reference to the housing but permit of its axial movement with reference thereto and as many of these tooth-and-notch connections as desired may be used.

In place of the bosses 40 and 42 I may use the studs 40' and 42' secured in the disc 38 and cover plate 44, respectively, as shown in Fig. 3.

From the foregoing description of the drive connection between the spider or disc 30 and the gear 24, it will be evident that under ordinary conditions the drive will be positive for the reason that the springs 46 will be able to maintain a comparatively close frictional contact between the abutting surfaces of the disc and gear. However, if the supercharger drive should become overloaded, or if the engine should be given to racing or sudden changes of speed, the gears and working parts are likely to become damaged unless provision is made in the mechanism for absorbing the excessive torque transmitted from the crankshaft. The absorption of this excessive torque or overload is taken care of by the slip which will be allowed by the springs 46 between the surfaces of the disc 30 and gear 24. During overloads or sudden changes of speed, therefore, the drive is not a positive one but a certain lost motion is permitted, while when the engine returns to conditions of normal loads or speed, the drive becomes a positive one.

For the purpose of driving the rotor 48 of the supercharger 50 I provide a shaft 52 which at its rear end has a gear 54, preferably formed integral therewith although a separate gear may be used. The shaft 52 is secured to the rotor 48 by means of the teeth 56. The inner portion of the rotor hub is conical as shown at 58 to conform to the conical portion 60 of the shaft 52. Between the conical portion 60 and the gear 54 is a plain bearing surface 53, mounted in a bearing 55 in the crankcase section 12. The outer portion of the hub of the rotor is conical as shown at 62 for the reception of a conical bushing 64 held in place by means of a collar 66 threaded onto the shaft 52. The extreme outer end 68 of the shaft 52 is set in a ball bearing 70 at the outer end of the supercharger. The outlet to the supercharger is shown at 74.

The operation of the drive is as follows: Power from the crankshaft will be transmitted through the keyed connection 32 to the disc or spider 30 which is frictionally held against the inner face of the driving member 24 and forward face of disk 38 by the spring 46. This frictional engagement will cause the rotation of the driving member 24 which in turn will communicate its motion to the gear 54 of the shaft 52 which will drive the rotor 48 and the blades 78 of the supercharger 50. When the engine is overloaded or during sudden changes of speed the friction caused by the springs 46 between the surface of the disc 30 and the driving member 24 is insufficient to transmit the drive which will permit of a slippage between the two surfaces. This slippage will prevent damage to the mechanism and will take the shock off the gear teeth during acceleration periods and will accordingly act as a vibration damper.

I claim:

1. In a power take-off mechanism as applied to prime movers having a crankshaft, a driving member mounted on said shaft, a driven member operatively connected to said driving member, and means for transmitting motion from the crankshaft to the driving member comprising an element secured to the shaft, a plate secured to the driving member and enclosing said element, and a plurality of springs between said plate and element to cause operative engagement between said driving member and said element.

2. The invention of claim 1, a ring over said element, projections on said ring and plate, said projections positioning said springs.

3. In a supercharger drive as applied to internal combustion engines, a driving gear on the crankshaft, a driven gear meshing with said driving gear, a member operatively connected to said driven gear to drive the supercharger, and means for transmitting power from the crankshaft to the driving gear, said means comprising a cover plate secured to the driving gear, a disc secured to the crankshaft, and a plurality of resilient elements between said plate and disc for causing operative engagement between said disc and driving gear.

4. In a supercharger drive as applied to internal combustion engines, a driving gear on the crankshaft, a driven gear meshing with said driving gear, a member operatively connected to said driven gear to drive the supercharger, and means for transmitting power from the crankshaft to the driving gear, said means comprising a disc secured to the crankshaft, a plate secured to the driving gear and inclosing said disc, and resilient means between the plate and disc to cause their operative engagement with each other.

5. In a supercharger drive for internal combustion engines having a crank shaft, an internal gear loosely mounted on the end of said crankshaft, a plate rigidly mounted on said crankshaft and adapted for frictional engagement with said internal gear to rotate the same, means to cause frictional engagement between said gear and plate, and means to drive a supercharger from said gear.

6. In a supercharger drive for internal combustion engines having a crankshaft, a plate rigidly mounted on said shaft, a gear loosely mounted on said shaft, means secured to said gear and extending around said plate, resilient means between said means and plate to cause the gear to frictionally engage the plate to be driven thereby, and means to drive a supercharger from said gear.

7. In a supercharger drive for internal combustion engines having a crankshaft, a plate rigidly mounted on said shaft, a gear loosely mounted on said shaft, means secured to said gear and extending around said plate, a plurality of projections on said means, resilient means between said plate and said means positioned by said projections and holding said gear in frictional engagement with said plate to be driven thereby, and means to drive a supercharger from said gear.

8. In a supercharger drive for internal combustion engines having a crankshaft, a plate rigidly mounted on said shaft, a gear loosely mounted on said shaft, means secured to said gear and extending around said plate, a plurality of conformable projections on said means and said plate, resilient means between said plate and said means positioned by said projections and holding said gear in frictional engagement with said plate to be driven thereby, and means to drive a supercharger from said gear.

In testimony whereof I affix my signature.

ROLAND V. HUTCHINSON.